(12) United States Patent
Shikata et al.

(10) Patent No.: US 7,216,613 B2
(45) Date of Patent: May 15, 2007

(54) VARIABLE VALVE CONTROL APPARATUS FOR INTERNAL COMBUSTION ENGINE

(75) Inventors: Yasuhiro Shikata, Kariya (JP); Masayuki Kita, Kariya (JP)

(73) Assignee: Denso Corporation, Kariya, Aichi-pref. (JP)

(*) Notice: Subject to any disclaimer, the term of this patent is extended or adjusted under 35 U.S.C. 154(b) by 0 days.

(21) Appl. No.: 11/299,823

(22) Filed: Dec. 13, 2005

(65) Prior Publication Data
US 2006/0124091 A1    Jun. 15, 2006

(30) Foreign Application Priority Data
Dec. 15, 2004    (JP) .......................... 2004-363506

(51) Int. Cl.
*F01L 1/34* (2006.01)
(52) U.S. Cl. ............... 123/90.15; 123/90.16; 123/90.17; 123/90.31
(58) Field of Classification Search ............ 123/90.15, 123/90.16, 90.17, 90.31
See application file for complete search history.

(56) References Cited

U.S. PATENT DOCUMENTS 6,386,158 B1 *    5/2002    Takahashi ................ 123/90.15

FOREIGN PATENT DOCUMENTS

JP            9-256878        9/1997

* cited by examiner

*Primary Examiner*—Thomas Denion
*Assistant Examiner*—Zelalem Eshete
(74) *Attorney, Agent, or Firm*—Nixon & Vanderhye P.C.

(57) ABSTRACT

A reference model simulates a desired response characteristic of the variable valve timing apparatus and is constructed by using a dynamic characteristic in a region of the maximum changing speed of the valve timing of the variable valve timing apparatus. The variable valve timing apparatus is constructed of the control system with two degrees of freedom in which in the controller, the feedback duty is calculated so that the deviation between the output obtained by applying the time delay to the output of the quickest response model and the valve timing is small, and in the reverse VCT model, the feed forward duty is calculated so that the target advance amount is realized based upon the output of the quickest response model, and the control duty of the variable valve timing apparatus is obtained by addition of the feedback duty and the feed forward duty.

11 Claims, 8 Drawing Sheets

VARIABLE VALVE CONTROL APPARATUS FOR INTERNAL COMBUSTION ENGINE

CROSS-REFERENCE TO RELATED APPLICATION

This application is based on Japanese Patent Application No. 2004-363506 filed on Dec. 15, 2004, the disclosure of which is incorporated herein by reference.

FIELD OF THE INVENTION

The present invention relates to a variable valve control apparatus for an internal combustion engine in which a variable valve apparatus for changing valve opening/closing characteristics of an intake valve or an exhaust valve is a control object.

BACKGROUND OF THE INVENTION

There has been recently increasing an in-vehicle internal combustion engine using a variable valve apparatus which changes valve opening/closing characteristics such as valve timing or a valve lift amount of an intake valve or an exhaust valve for the purpose of a power output improvement, a fuel economy improvement, reduction of exhaust emissions and the like. There is, however, a problem with an occurrence of variations in responsiveness of variable valve control caused by variations in the manufacture of the variable valve apparatus or variations in performance of the variable valve apparatus due to aging.

Japanese Unexamined Patent Publication No. 9-256878 has, for solving this problem, disclosed a variable valve timing apparatus which calculates a changing speed of valve timing at the time of maintaining a control input (control duty of a hydraulic control valve) of the variable valve timing apparatus at a predetermined value and corrects the control input of the variable valve timing apparatus so as to reduce a difference between the changing speed of the valve timing and a predetermined speed.

In addition, Japanese Unexamined Patent Publication No. 2002-155766(U.S. Pat. No. 6,386,158B1) has disclosed a variable valve timing apparatus which sets a reference model which simulates characteristics as a reference of the variable valve timing apparatus and calculates a control input of the variable valve timing apparatus so that a difference between an output of the reference model and an actual valve timing of the variable valve timing apparatus is reduced.

In general, as shown in FIG. 4, in a variable valve timing apparatus of a hydraulically driven type, a changing speed (advance speed or retard speed) of valve timing changes with a control input (control duty of a hydraulic control valve). It is found out, however, according to the recent experimental result of the inventors, that the variable valve timing apparatus is characterized in that in a region where the changing speed of the valve timing becomes substantially a maximum, variations in the changing speed of the valve timing get small and in a region other than the above region, variations in the changing speed of the valve timing get relatively large.

However, since, in the variable valve controls as described above, the characteristic as a reference thereof is uniformly without consideration of the feature in regard to variations in performance of the variable valve timing apparatus, the characteristic as the reference is required to be set for adaptation to a variable valve apparatus as a lower limit product on variations in performance for realization of the characteristic as the reference even in the variable valve apparatus which is the lower limit product on the variations in the performance. As a result, there occurs the problem that responsiveness of the variable valve control is sacrificed for compensation for the variations in performance of the variable valve apparatus.

SUMMARY OF THE INVENTION

The present invention has been made from a viewpoint of the forgoing problems and therefore, has an object of providing a variable valve control apparatus for an internal combustion engine which improves responsiveness of a variable valve control while compensating for variations in responsiveness of the variable valve control caused by variations in performance of the variable valve apparatus.

A variable valve control apparatus for an internal combustion engine according to the present invention, in order to achieve the above object, comprises a variable valve apparatus to change valve opening/closing characteristics of an intake valve or an exhaust valve for the internal combustion engine, a reference model to simulate a desired response characteristic of the variable valve apparatus, a valve timing control section to control valve timing of the variable valve apparatus by operating a control input of the variable valve apparatus in such a way as to realize a target value of the valve timing by using the reference model, and a control input-calculating section to control the control input of the variable valve apparatus based upon an output of the reference model obtained when the target value is input to the reference model, wherein the reference model is constructed by using a dynamic characteristic of the variable valve apparatus in a region where a changing speed of the valve timing of the variable valve apparatus becomes a maximum changing speed of the valve timing or in the vicinity thereof.

The present invention may be applied to any one of a variable valve timing control and a variable valve lift control and in the variable valve timing control, "a maximum changing speed of valve timing" means both of a maximum advance speed and a maximum retard speed.

The present invention operates a control input of the variable valve apparatus so that a difference between the output of the reference model and the valve timing of the variable valve apparatus is made small, thus compensating for variations in responsiveness of the variable valve control caused by variations in performance of the variable valve apparatus. In addition, since there is the feature that variations in a changing speed of the valve timing of the variable valve apparatus get small in the region of a maximum changing speed of the valve timing of the variable valve apparatus, when the variable valve apparatus is controlled by using the region of the maximum changing speed of the valve timing with priority, it becomes possible to control even the variable valve apparatus as the lower limit product on variations in performance with a changing speed of the valve timing (close to the maximum changing speed of the valve timing) which is substantially the same as in the variable valve apparatus as the upper limit product or the intermediate product on variations in performance. The present invention, based upon this respect, uses a reference model simulating the dynamic characteristic of the variable valve apparatus which is in the region of the maximum changing speed of the valve timing of the variable valve apparatus, thereby making it possible to control the variable valve apparatus positively using the region of the maximum changing speed of the valve timing of the variable valve apparatus and leading to an improvement of responsiveness in the variable valve control.

BRIEF DESCRIPTION OF THE DRAWINGS

These and other objects, features, aspects and advantages of the present invention will be become apparent to those skilled in the art from the following detailed description, which, taken in conjunction with the annexed drawings, discloses a preferred embodiment of the present invention.

DETAILED DESCRIPTION OF EMBODIMENT

A preferred embodiment of the present invention will be hereinafter explained with reference to the drawings.

Figure 1:
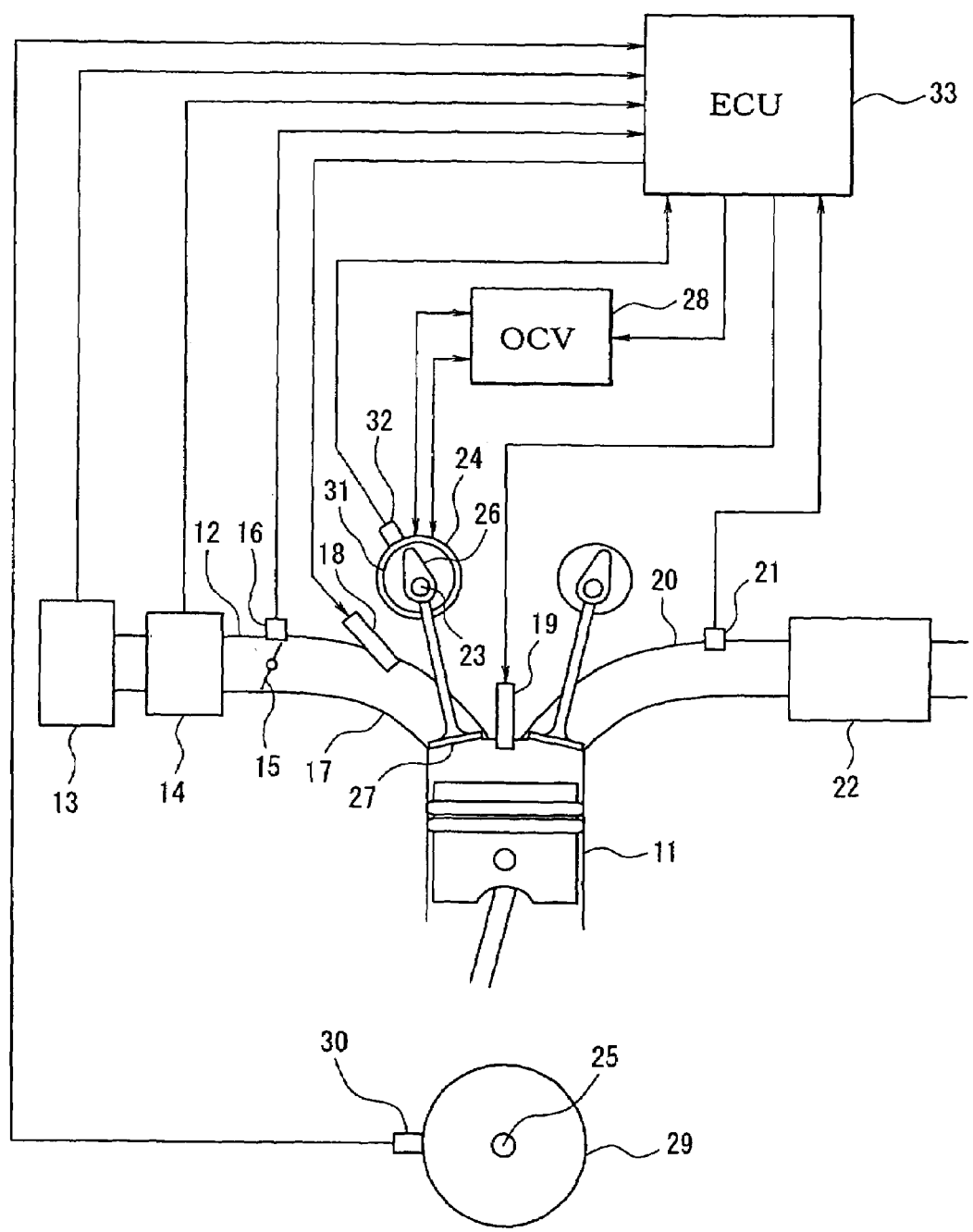
FIG. 1 is a schematic arrangement view of an entire engine control system in a preferred embodiment of the present invention.

Firstly, a schematic arrangement of an entire engine control system will be explained with reference to FIG. 1. An air cleaner 13 is disposed in the most upstream portion of an intake pipe 12 for an engine 11 as an internal combustion engine and an air-flow meter 14 for detecting an intake air quantity is disposed in the downstream side of the air cleaner 13. A throttle valve 15 an opening of which is adjusted by a motor or the like and a throttle opening sensor 16 for detecting the opening (throttle opening) of the throttle valve 15 are disposed in the downstream side of the air-flow meter 14.

A fuel injection valve 18 is mounted in the vicinity of an intake port of an intake manifold 17 introducing air into each cylinder of the engine 11. Further, an ignition plug 19 is mounted in a cylinder head of the engine 11 for each cylinder and a mixture in the cylinder is ignited by spark discharge of each ignition plug 19.

On the other hand, an exhaust gas sensor 21 (an air-fuel ratio sensor, an oxygen sensor or the like) for detecting an air-fuel ratio, richness/leanness or the like of an exhaust gas is disposed in an exhaust tube 20 of the engine 11, and a catalyst 22 such as a three-way catalyst for purifying an exhaust gas is disposed in the downstream side of the exhaust gas sensor 21.

Figure 2:
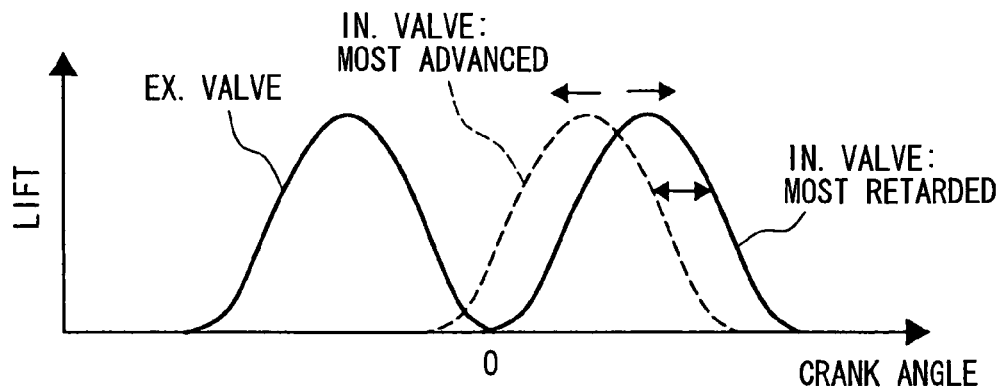
FIG. 2 is a valve lift characteristic graph for explaining variable operations of valve timing by a variable valve timing apparatus.

In addition, a variable valve timing apparatus of a hydraulically driven type 24 is mounted to an intake side cam shaft 23 of the engine 11 and this variable valve timing apparatus 24 advances a rotation phase of the intake side cam shaft 23 relative to a crank shaft 25, so that, as shown in FIG. 2, the valve timing of an intake valve 27 driven by an intake side cam 26 for opening/closing thereof is arranged to be advanced from the maximum retard position (reference position). An operating oil (engine oil) in an oil pan (not shown) is supplied to a hydraulic circuit of the variable valve timing apparatus 24 and the intake valve timing (valve timing of the intake valve 27) is controlled due to controlling the hydraulic pressure in the hydraulic circuit by an oil control valve 28 (OCV).

A crank angle sensor 30 is attached to an outer periphery side of the crank shaft 25 in such a way as to face a signal rotor 29 rotating integrally with the crank shaft 25 and a cam angle sensor 32 is attached to an outer periphery side of the intake side cam shaft 23 in such a way as to face a signal rotor 31 rotating integrally with the intake side cam shaft 23. The crank angle sensor 30 outputs a crank angle signal for each predetermined crank angle caused by rotation of the crank shaft 25 and the cam angle sensor 32 outputs a cam angle signal for each predetermined cam angle caused by rotation of the intake side cam shaft 23.

A crank angle or an engine rotation speed is detected based upon an output signal of the crank angle sensor 30 and an actual advance amount of the intake valve timing is detected based upon an output signal of the cam angle sensor 32 and the output signal of the crank angle sensor 30.

Outputs of these various sensors are input to an engine control circuit (hereinafter, referred to as ECU) 33. The ECU 33 is constructed mainly of a microcomputer and carries out various engine control programs stored in a. ROM (memory medium) housed therein, thus controlling a fuel injection amount of the fuel injection valve 18 or ignition timing of the ignition plug 19 in response to an engine operational condition.

In addition, the ECU 33 carries out each program for valve timing control shown from in FIG. 5 to FIG. 8 described later and thereby, calculates an actual advance amount of the intake valve timing based upon the output signal of the cam angle sensor 32 and the output signal of the crank angle sensor 30, as well as calculates a target advance amount of the intake valve timing based upon an engine operational condition, and controls the variable valve timing apparatus 24 (hydraulic control valve 28) so that the actual advance amount is equal to the target advance amount.

Figure 3:
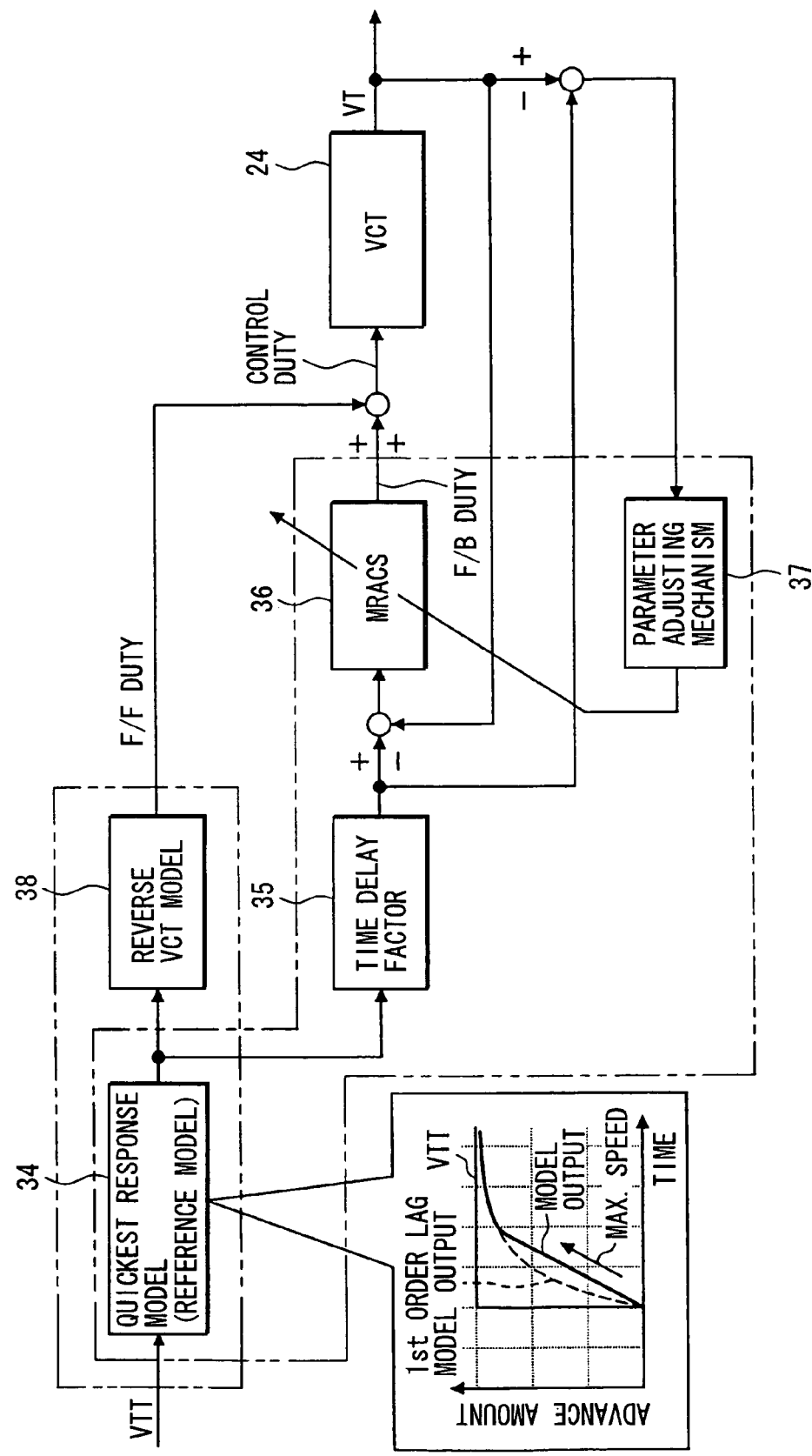
FIG. 3 is a block diagram showing functions of the valve timing control.

On this occasion, the ECU 33, as shown in FIG. 3, operates a control input (control duty of the hydraulic control valve 28) of the variable valve timing apparatus 24 to control the valve timing (actual advance amount) of the variable valve timing apparatus 24 in such a way as to realize a target advance amount by using a quickest response model 34 as a reference model simulating a desired response characteristic of the variable valve timing apparatus 24.

Figure 4:
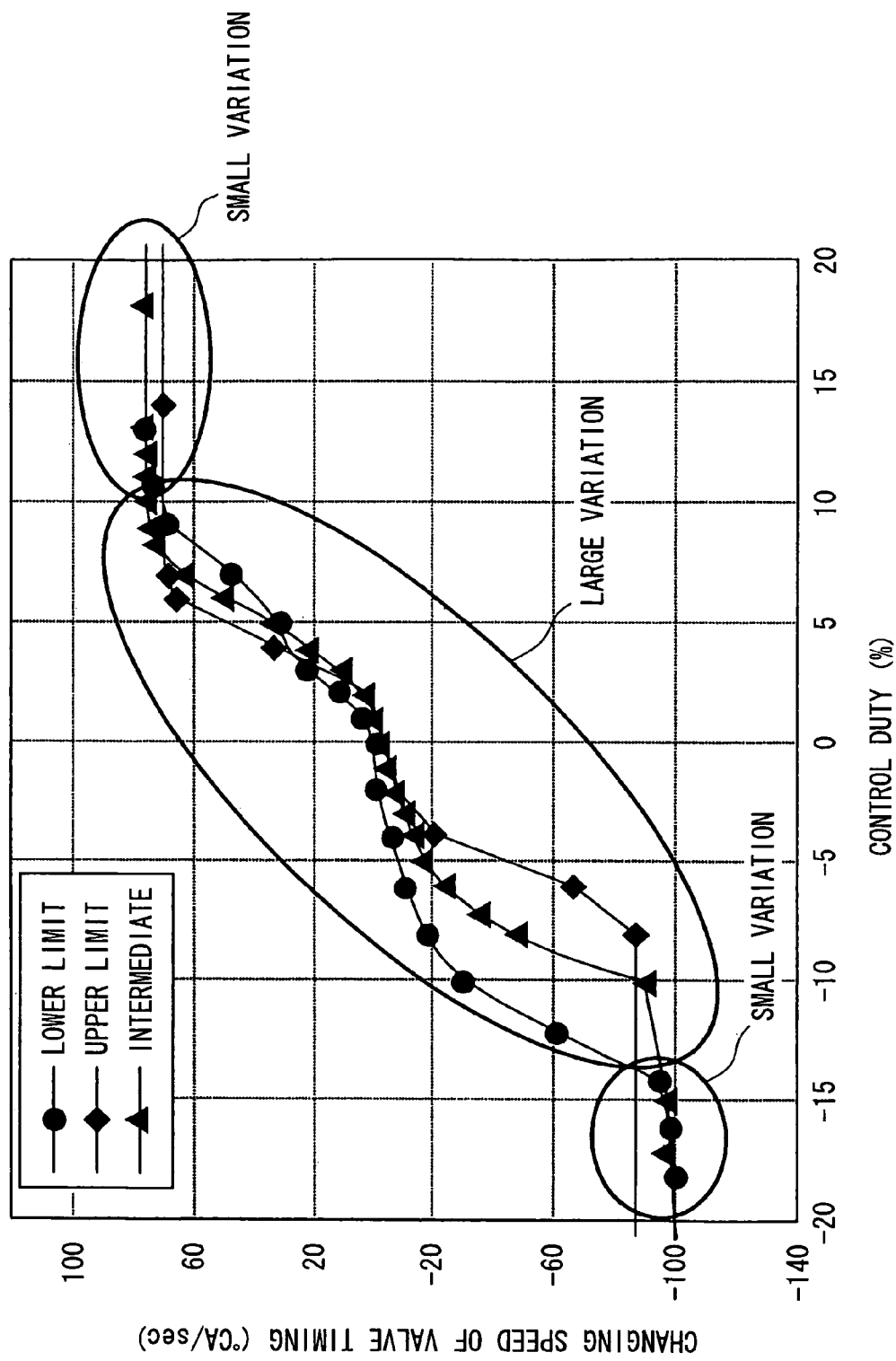
FIG. 4 is a characteristic graph showing a relation between a control duty of the variable valve timing apparatus and a changing speed of the valve timing.

Herein, as shown in FIG. 4, for example, in the variable valve timing apparatus 24 of the hydraulically driven type, a changing speed (advance speed or retard speed) of the valve timing changes in accordance with a control input (control duty of the hydraulic control valve 28), and since there is the feature that variations in a changing speed of the valve timing of the variable valve timing apparatus 24 get small in the region of a maximum changing speed (in the region where the advance speed or the retard speed becomes a maximum or close thereto) of the valve timing, when the variable valve timing apparatus 24 is controlled by using the region of the maximum changing speed of the valve timing, it becomes possible to control even the variable valve timing apparatus 24 as the lower limit product on variations in performance with a changing speed of the valve timing (in the vicinity of the maximum changing speed of the valve timing) which is substantially the same as in the variable valve timing apparatus 24 as the upper limit product or the intermediate product on variations in performance.

The present embodiment invention, as shown in FIG. 3, based upon this respect, constitutes the quickest response model 34 (a reference model) by using the dynamic characteristic of the variable valve apparatus 24 in the region of the maximum changing speed of the valve timing of the variable valve apparatus 24. More specially, a value obtained by limiting an output changing speed of a first-order lag model in a target advance amount with the maximum changing speed of the valve timing is set as an output changing speed of the quickest response model 34 and an output of the quickest response model 34 is made by integrating the output changing speed of the quickest response model 34. Thereby, when the output of the first-order lag model gets close to the target advance amount and the output changing speed of the first-order lag model enters into a region where the output changing speed of the first-order lag model is slower than the maximum changing speed of the valve timing, the output of the first-order lag model is used as the output of the quickest response model 34.

A time delay (response delay time to control input) of the variable valve timing apparatus 24 calculated in a time delay factor 35 is applied to the output of the quickest response model 34 obtained at the time of inputting the target advance amount into the quickest response model 34. This time delay factor 35 corresponds to time delay calculating means.

Thereafter, a MRACS (Model Reference Adaptive Control System) controller 36 calculates a feedback duty which is a feedback operation amount so that a deviation between an output obtained by applying the time delay to the output of the quickest response model 34 and the valve timing (actual advance amount) of the variable valve timing apparatus 24 becomes small. This MRACS controller 36 corresponds to a feedback term.

When the dynamic characteristic of the variable valve timing apparatus 24 changes due to a change of an operation circumference such as an oil temperature or aging, the deviation between the output obtained by applying the time delay to the output of the quickest response model 34 and the valve timing of the variable valve timing apparatus 24 becomes large, but a parameter of the MRACS controller 36 is adjusted by a parameter adjusting mechanism 37 so that the deviation becomes small.

On the other hand, a reverse VCT model 38 is a reverse model of a model simulating the variable valve timing apparatus 24 and calculates a feed forward duty which is a feed forward operation amount in such a way as to realize the target advance amount based upon the output of the quickest response model 34. This reverse VCT model 38 corresponds to a feed forward term.

Thereafter, a control duty of the variable valve timing apparatus 24 is obtained by addition of the feedback duty calculated in the MRACS controller 36 and the feed forward duty calculated in the reverse VCT model 38. The function of the ECU 33 to calculate the control duty with an arrangement of a control system with two degrees of freedom individually calculating the feedback duty and the feed forward duty corresponds to a control input calculating section.

The valve timing control as explained above is performed according to the programs shown in from FIG. 5 to FIG. 8 by the ECU 33. Processing contents of the programs will be hereinafter explained.

[Valve Timing Control]

Figure 5:
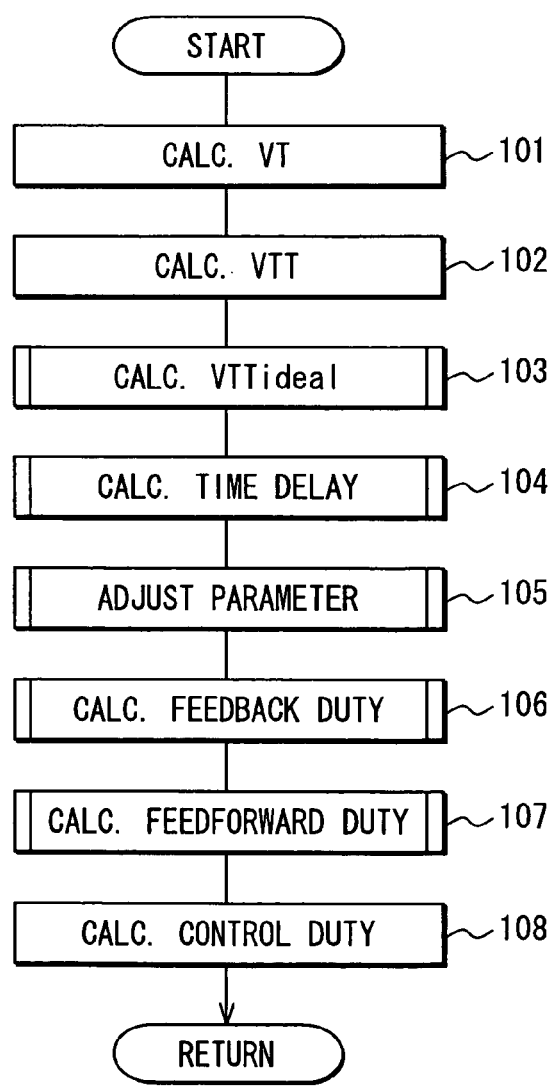
FIG. 5 is a flow chart showing flow of the processing of a control program of the valve timing.

A program of the valve timing control shown in FIG. 5 is carried out at a predetermined cycle during power-on of the ECU 33. When this program is activated, firstly at step S101, an actual advance amount VT of the intake valve timing is calculated based upon an output signal of the cam sensor 32 and an output signal of the crank angle sensor 30 and next, at step Si 02, a target advance amount VTT of the intake valve timing is calculated based upon an engine operational condition (for example, an engine rotation speed, an engine load or the like).

Then, the process goes to step S103, wherein an output calculation program of the quickest response model 34 in FIG. 6 described later is carried out to calculate an output VTTideal of the quickest response model 34 obtained at the time of inputting a target advance amount VTT into the quickest response model 34, and at next step S104, a calculation program of the time delay in FIG. 7 described later is carried out to calculate the time delay of the variable valve timing apparatus 24.

Thereafter, the process goes to step S105, wherein a parameter adjusting program (not shown) is carried out to adjust a parameter of the MRACS controller 36 so that a deviation between an output obtained by applying the time delay to the output VTTideal of the quickest response model 34 and an actual advance amount VT which is an output of the variable valve timing apparatus 24 becomes small.

Then, the process goes to step S106, wherein an output calculation program of the MRACS controller 36 (not shown) is carried out to calculate a feedback duty so that the deviation between the output obtained by applying the time delay to the output VTTideal of the quickest response model 34 and the actual advance amount VT which is the output of the variable valve timing apparatus 24 becomes small.

Thereafter, the process goes to step S107, wherein an output calculation program of the reverse VCT model 38 in FIG. 8 described later is carried out to calculate the feed forward duty in such a way as to realize the target advance amount VTT based upon the output VTTideal of the quickest response model 34, and at next step S108, a control duty of the variable valve timing apparatus 24 is obtained by addition of the feedback duty and the feed forward duty.

[Output Calculation of Quickest Response Model]

Figure 6:
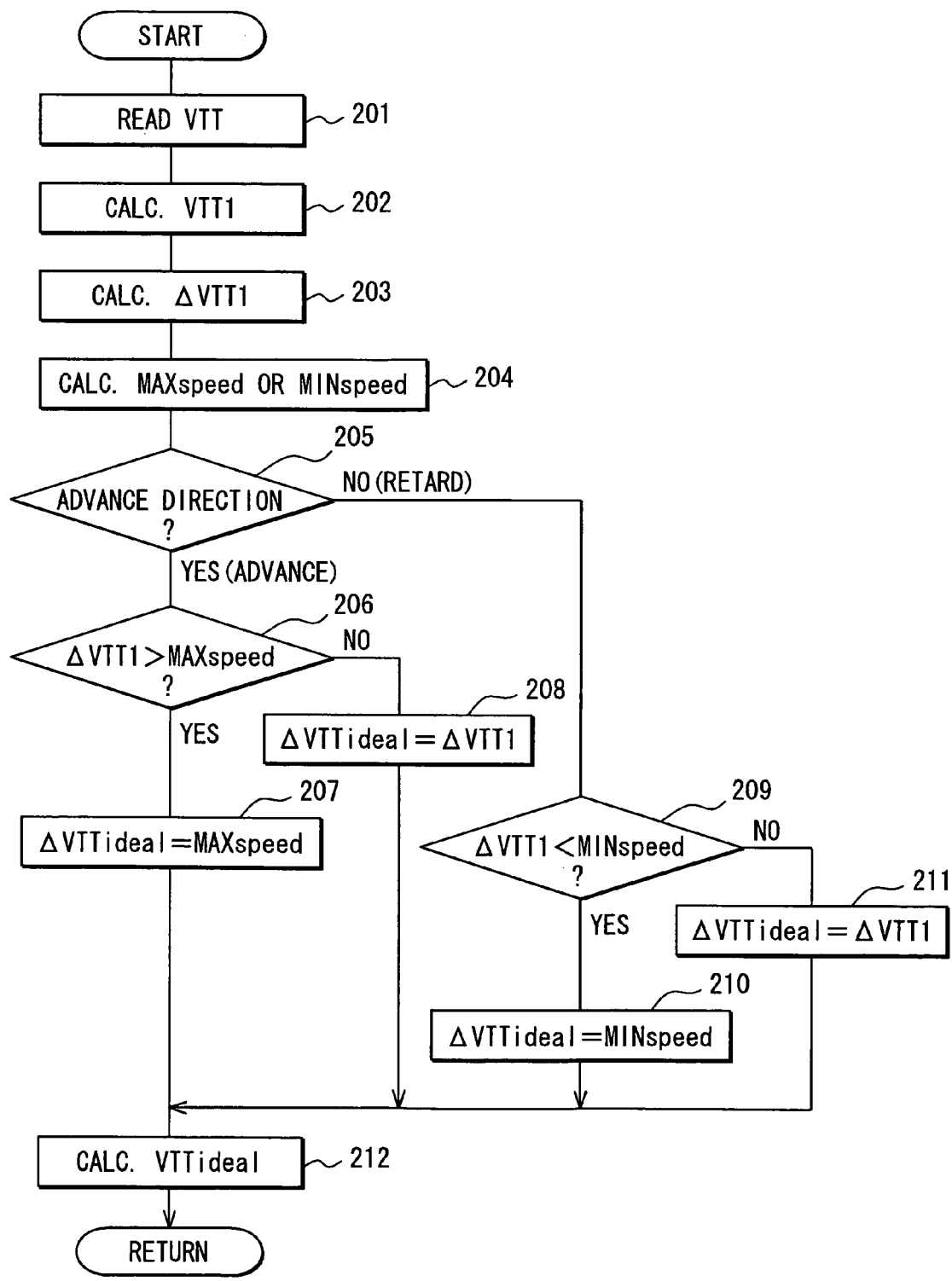
FIG. 6 is a flow chart showing flow of the processing of an output calculation program of the quickest response model.

An output calculation program of the quickest response model 34 shown in FIG. 6 is a subroutine performed at step S103 of the program of the valve timing control in FIG. 5 described before. When the output calculation program is started, firstly at step S201 a target advance amount VTT calculated based upon an engine operational condition (for example, an engine rotation speed, an engine load or the like) is read in.

Thereafter, the process goes to step S202, wherein an output VTT1 of the first-order lag model of the target advance amount VTT is calculated and then, the process goes to step S203, wherein an output changing speed Δ VTT1 of the first-order lag model is obtained by differentiating the output VTT1 of the first-order lag model.

Thereafter, the process goes to step S204, wherein a maximum changing speed of the valve timing (the maximum advance speed MAX speed or the maximum retard speed MIN speed) of the variable valve timing apparatus 24 is calculated based upon a condition (for example, oil temperature, water temperature, engine rotation speed, target advance amount, actual advance amount, advance direction, or the like) of the engine 11 or the variable valve timing apparatus 24.

Thereafter, the process goes to step S205, wherein it is judged whether or not a changing direction of the present valve timing is an advance direction. When it is judged that the changing direction of the present valve timing is an advance direction, at the next steps from S206 to S208, a value obtained by limiting the output changing speed Δ VTT1 of the first-order lag model with the maximum advance speed MAX speed is adopted as the output changing speed Δ VTTideal of the quickest response model 34.

More specially, firstly it is judged at step S206 whether or not the output changing speed Δ VTT1 of the first-order lag model is quicker than the maximum advance speed MAX speed. As a result, when it is judged that the output changing speed Δ VTT1 of the first-order lag model is quicker than the maximum advance speed MAX speed, the process goes to step S207, wherein the maximum advance speed MAX speed is adopted as the output changing speed Δ VTTideal of the quickest response model 34.

Δ VTTideal=MAX speed.

On the other hand, when it is judged that the output changing speed Δ VTT1 of the first-order lag model is slower than the maximum advance speed MAX speed, the process goes to step S208, wherein the output changing speed Δ VTT1 of the first-order lag model is adopted as the output changing speed Δ VTTideal of the quickest response model 34.

Δ VTTideal=Δ VTT1.

When it is judged at step S205 that the changing direction of the present valve timing is a retard direction, at the next steps from S209 to S211, a value obtained by limiting the output changing speed Δ VTT1 of the first-order lag model with the maximum retard speed MIN speed is adopted as the output changing speed Δ VTTideal of the quickest response model 34.

More specially, firstly it is judged at step S209 whether or not the output changing speed Δ VTT1 of the first-order lag model is slower than the maximum retard speed MIN speed. As a result, when it is judged that the output changing speed Δ VTT1 of the first-order lag model is slower than the maximum retard speed MIN speed, the process goes to step S210, wherein the maximum retard speed MIN speed is adopted as the output changing speed Δ VTTideal of the quickest response model 34.

Δ VTTideal=MIN speed.

On the other hand, when it is judged that the output changing speed Δ VTT1 of the first-order lag model is quicker than the maximum retard speed MIN speed, the process goes to step S211, wherein the output changing speed Δ VTT1 of the first-order lag model is adopted as the output changing speed Δ VTTideal of the quickest response model 34.

Δ VTTideal=Δ VTT1.

In this way, a value obtained by limiting the output changing speed Δ VTT1 of the first-order lag model with the maximum changing speed of the valve timing (the maximum advance speed MAX speed or the maximum retard speed MIN speed) is adopted as the output changing speed Δ VTTideal of the quickest response model 34 and thereafter, the process goes to step S212, wherein the output VTTideal of the quickest response model 34 is obtained by integrating the output changing speed Δ VTTideal of the quickest response model 34.

[Calculation of Time Delay]

Figure 7:
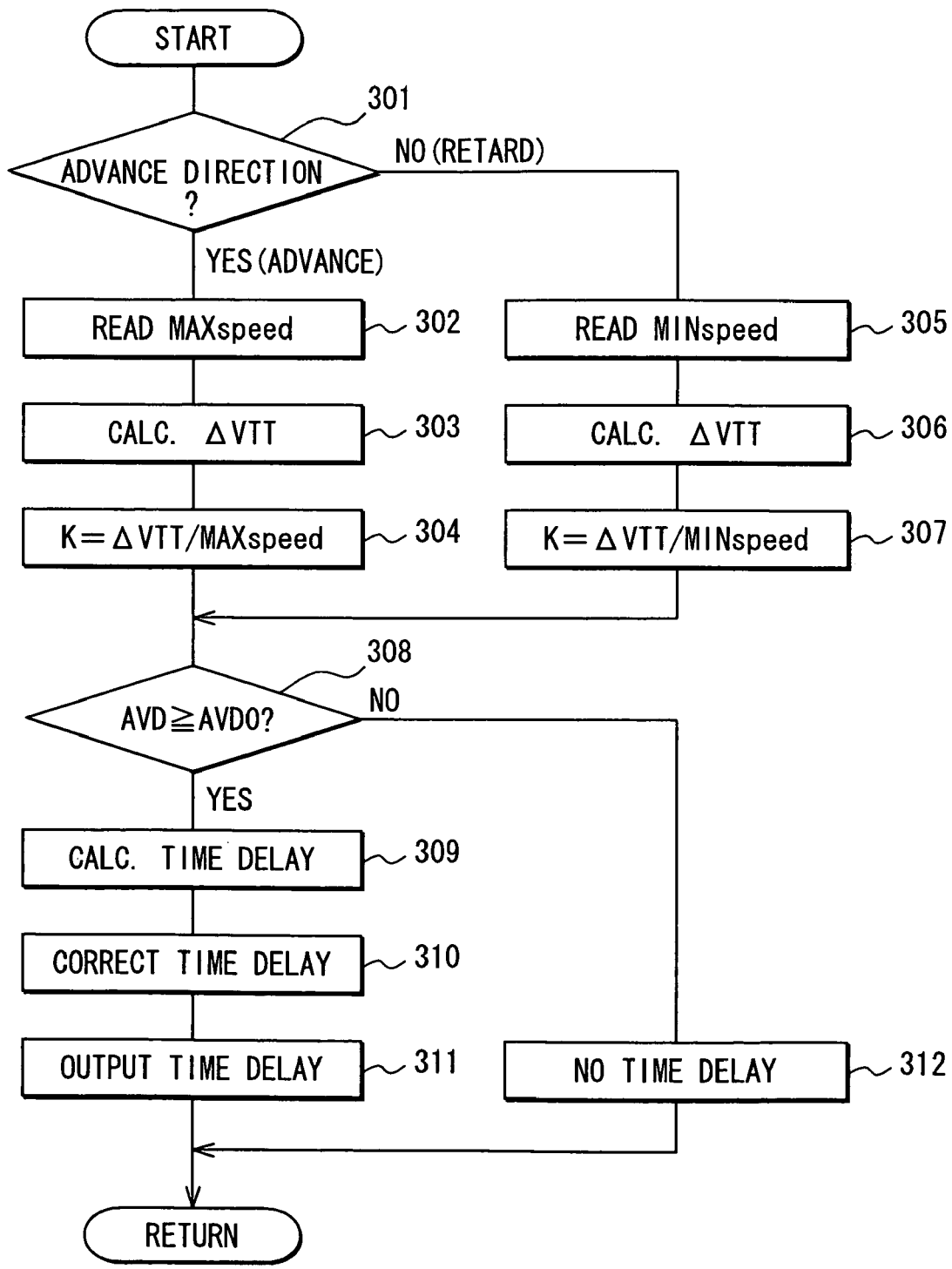
FIG. 7 is a flow chart showing flow of the processing of a calculation program of time delay.

A calculation program of the time delay shown in FIG. 7 is a subroutine performed at step S104 of the program of the valve timing control in FIG. 5 described before. When the calculation program is started, firstly at step S301 it is judged whether or not a present changing direction of the valve timing is an advance direction. When it is judged that the present changing direction of the valve timing is an advance direction, the process goes to step S302, wherein the maximum advance speed MAX speed calculated based upon the condition of the engine 11 or the variable valve timing apparatus 24 is read in. Then, the process goes to step S303, wherein a changing speed Δ VTT of the target advance amount is obtained by differentiating the target advance amount VTT.

Thereafter, the process goes to step S304, wherein a value obtained by dividing the changing speed Δ VTT of the target advance amount over the maximum advance speed MAX speed is obtained as a correction rate K of the time delay.

$K=\Delta VTT/\text{MAX speed}$.

On the other hand, when it is judged at step S301 that the present changing direction of the valve timing is a retard direction, the process goes to step S305, wherein the maximum retard speed MIN speed calculated based upon the condition of the engine 11 or the variable valve timing apparatus 24 is read in. Then, the process goes to step S306, wherein a changing speed Δ VTT of the target advance amount is obtained by differentiating the target advance amount VTT.

Thereafter, the process goes to step S307, wherein a value obtained by dividing the changing speed Δ VTT of the target advance amount over the maximum retard speed MIN speed is obtained as a correction rate K of the time delay.

$K=\Delta VTT/\text{MIN speed}$.

After calculating the correction rate K of the time delay, the process goes to step S308, wherein it is judged whether or not an absolute value AVD of a deviation between the target advance amount VTT and the output VTTideal of the quickest response model 34 is more than a predetermined value AVD0. When it is judged that the absolute value of the deviation between the target advance amount VTT and the output VTTideal of the quickest response model 34 is more than a predetermined value, the process goes to step S309, wherein the time delay of the variable valve timing apparatus 24 is calculated based upon the condition (for example, oil temperature, water temperature, engine rotation speed, target advance amount, actual advance amount, advance direction or the like) of the engine 11 or the variable valve timing apparatus 24.

Thereafter, the process goes to step S310, wherein the time delay is corrected by multiplying the time delay by the correction rate K of the time delay and thereafter, the process goes to step S311, wherein the time delay after the correction is outputted as a final time delay.

On the other hand, when it is judged at step S308 that the absolute value of the deviation between the target advance amount VTT and the output VTTideal of the quickest response model 34 is less than a predetermined value, the process goes to step S312, wherein the time delay is set as zero.

[Output Calculation of Reverse VCT Model]

Figure 8:
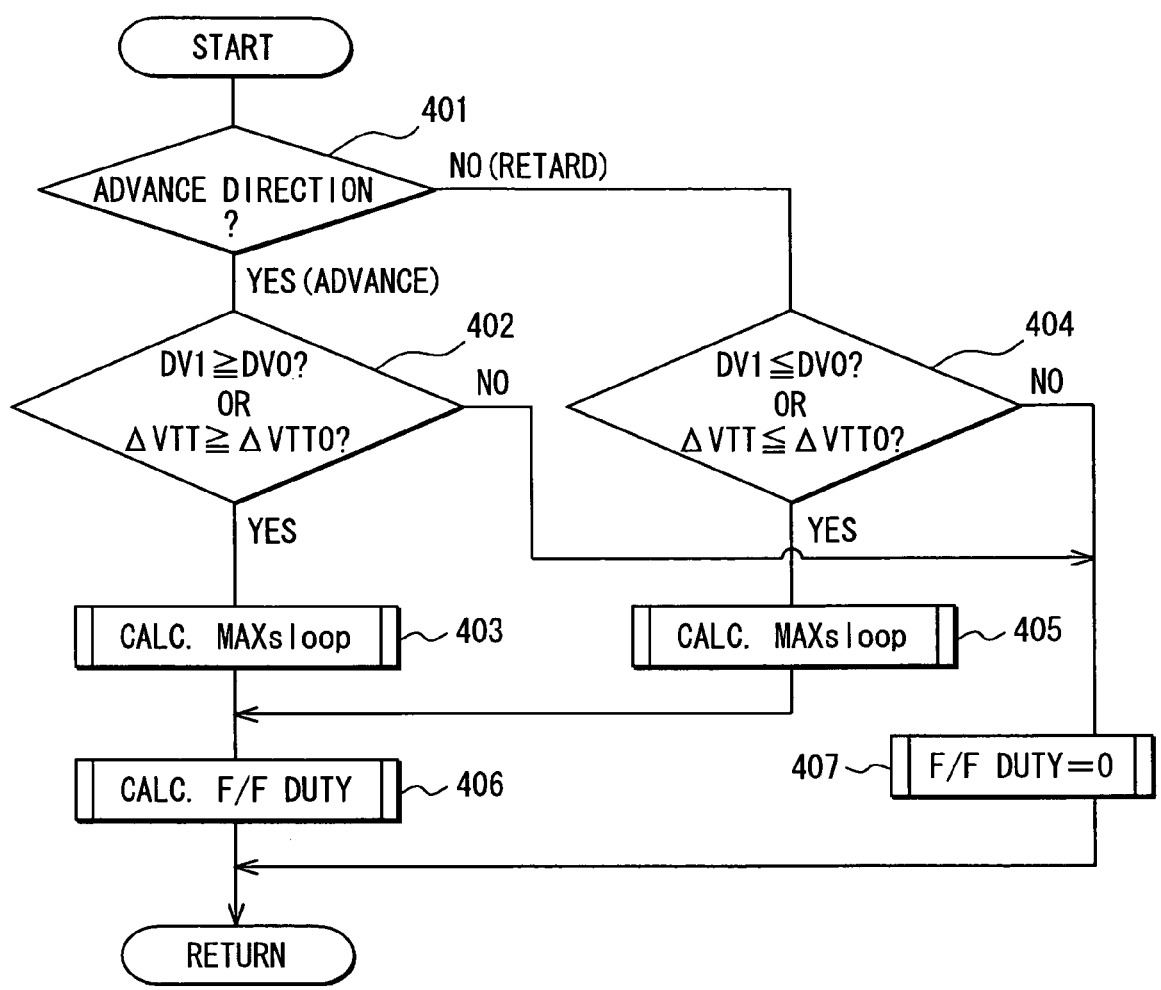
FIG. 8 is a flow chart showing flow of the processing of an output calculation program of a reverse VCT model.

An output calculation program of the reverse VCT model shown in FIG. 8 is a subroutine performed at step S107 of the program of the valve timing control in FIG. 5 described before. When the calculation program is started, firstly at step S401 it is judged whether or not a present changing direction of the valve timing is an advance direction. When it is judged that the present changing direction of the valve timing is an advance direction, the process goes to step S402, wherein it is judged whether or not a deviation DV1 between the target advance amount VTT and the actual advance amount VT is more than a predetermined value DV0 or whether or not the changing speed Δ VTT of the target advance amount is more than a predetermined value ΔVTT0.

When it is judged at step S402 that the deviation between the target advance amount VTT and the actual advance amount VT is more than a predetermined value or whether or not the changing speed Δ VTT of the target advance amount is more than a predetermined value, the process goes to step S403, wherein a feed forward gain MAXsloop in the advance direction is calculated based upon the condition (for example, oil temperature, water temperature, engine rotation speed, target advance amount, actual advance amount, advance direction or the like) of the engine 11 or the variable valve timing apparatus 24 and the characteristic (for example, changing speed characteristic of the valve timing to the control duty) of the variable valve timing apparatus 24.

Thereafter, the process goes to step S406, wherein the feed forward duty is calculated so that an advance speed of the variable valve timing apparatus 24 is equal to the output changing speed Δ VTTideal of the quickest response model 34.

In contrast to this, when it is judged at step S402 that the deviation between the target advance amount VTT and the actual advance amount VT is less than a predetermined value and the changing speed Δ VTT of the target advance amount is less than a predetermined value, the process goes to step S407, wherein the feed forward duty is set as zero.

On the other hand, when it is judged at step S401 that the changing direction of the valve timing is a retard direction, the process goes to step S404, wherein it is judged whether or not the deviation DV1 between the target advance amount VTT and the actual advance amount VT is less than a predetermined value DV0 or whether or not the changing speed Δ VTT of the target advance amount is less than a predetermined value Δ VTT0.

When it is judged at step S404 that the deviation between the target advance amount VTT and the actual advance amount VT is less than a predetermined value or whether or not the changing speed Δ VTT of the target advance amount is less than a predetermined value, the process goes to step S405, wherein a feed forward gain MAXsloop in the retard direction is calculated based upon the condition (for example, oil temperature, water temperature, engine rotation speed, target advance amount, actual advance amount, advance direction or the like) of the engine 11 or the variable valve timing apparatus 24 and the characteristic (for example, changing speed characteristic of the valve timing to the control duty) of the variable valve timing apparatus 24.

Thereafter, the process goes to step S406, wherein the feed forward duty is calculated so that a retard speed of the variable valve timing apparatus 24 is equal to the output changing speed Δ VTTideal of the quickest response model 34.

In contrast to this, when it is judged at step S404 that the deviation between the target advance amount VTT and the actual advance amount VT is more than a predetermined value and the changing speed Δ VTT of the target advance amount is more than a predetermined value, the process goes to step S407, wherein the feed forward duty is set as zero.

Since in the present embodiment as described above, the control duty of the variable valve timing apparatus 24 is operated so that the deviation between the output obtained by applying the time delay to the output of the quickest response model 34 (reference model) simulating a desired response characteristic of the variable valve timing apparatus 24 and the output of the variable valve timing apparatus 24 becomes small, the variations in responsiveness of the valve timing control due to the variations in performance of the variable valve timing apparatus 24 can be compensated.

Figure 9:
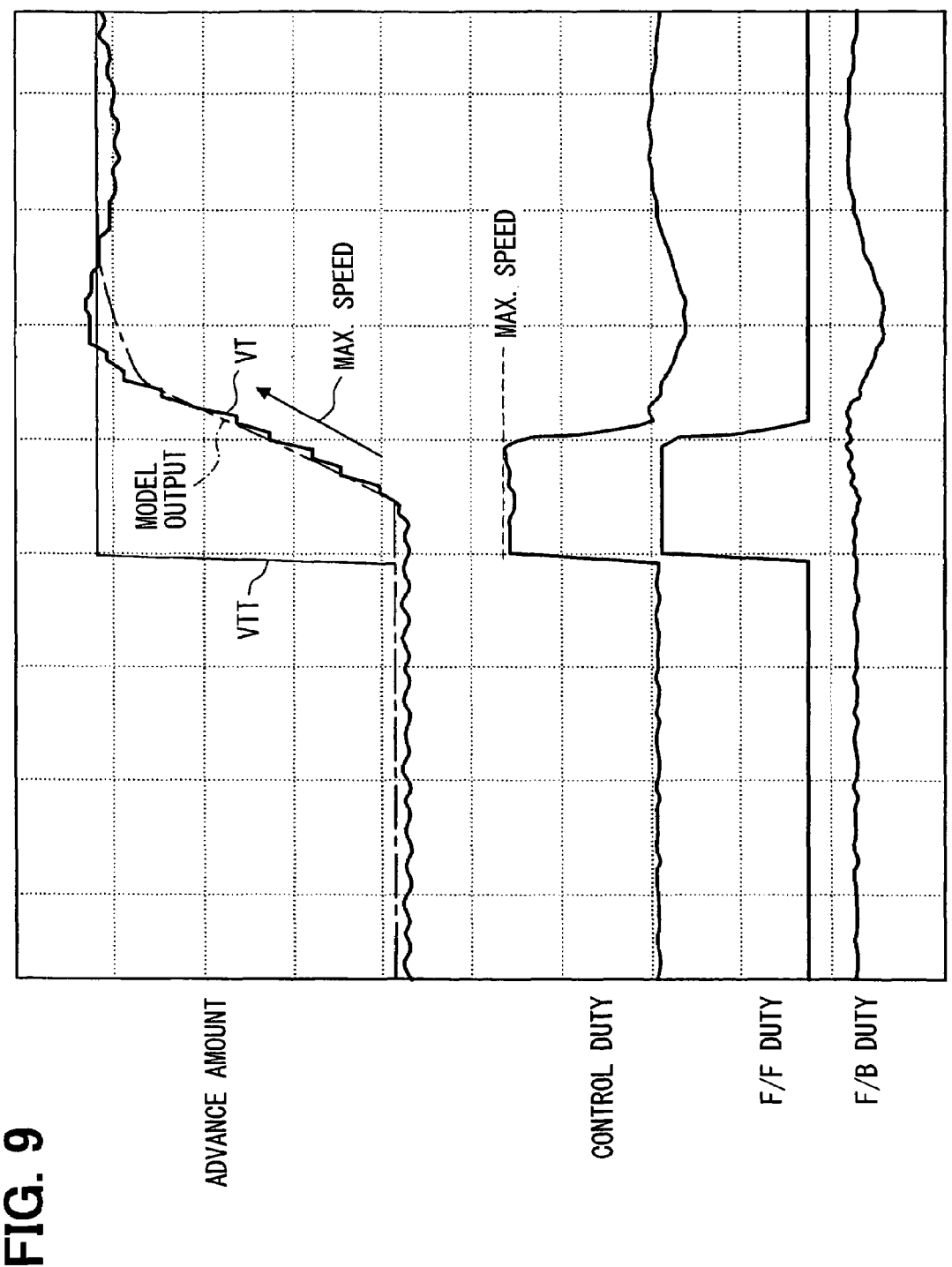
FIG. 9 is a time chart showing an execution example of valve timing control of the preferred embodiment.

In addition, the present embodiment, considering that the variations in the changing speed of the valve timing becomes small in the region of the maximum changing speed of the valve timing of the variable valve timing apparatus 24, uses the quickest response model 34 simulating the dynamic characteristic in the region of the maximum changing speed of the valve timing of the variable valve timing apparatus 24 and therefore, as shown in FIG. 9, it is possible to control the variable valve timing apparatus 24 by positively using the vicinity of the maximum changing speed of the valve timing of the variable valve timing apparatus 24.

As a result, it is possible to control even the variable valve apparatus as the lower limit product on variations in performance with a changing speed of the valve timing (close to the maximum changing speed of the valve timing) which is substantially the same as in the variable valve apparatus as the upper limit product or the intermediate product on variations in performance, as well as it is possible to improve responsiveness of the valve timing control.

In the present embodiment, the feed back duty is calculated in the MRACS controller 36 so that the deviation between the output obtained by applying the time delay to the output of the quickest response model 34 and the valve timing of the variable valve timing apparatus 24 becomes small, as well as the feed forward duty is calculated in the reverse VCT model 38 in such a way as to realize the target advance amount based upon the output of the quickest response model 34, and the control duty of the variable valve timing apparatus 24 is obtained by addition of the feedback duty and the feed forward duty, so that, as shown in FIG. 9, it is possible to calculate the control duty with the arrangement of the control system having two degrees of freedom individually calculating the feed back duty and the feed forward duty.

Accordingly, the present embodiment can improve responsiveness of an actual advance amount to a change of a target advance amount by the feed forward duty and at the same time, can improve convergence of the actual advance amount to the target advance amount by the feedback duty.

Since in the present embodiment, the maximum changing speed of the valve timing (the maximum advance speed MAX speed or maximum retard speed MIN speed) of the variable valve timing apparatus 24 is calculated based upon the condition (for example, oil temperature, water temperature, engine rotation speed, target advance amount, actual advance amount, advance direction, or the like) of the engine 11 or the variable valve timing apparatus 24 and the output of the quickest response model 34 is obtained by using the maximum changing speed of the valve timing, the maximum changing speed of the valve timing of the variable valve timing apparatus 24 changing with the condition of the engine 11 or the variable valve timing apparatus 24 is accurately calculated, thereby making it possible to control the variable valve timing apparatus 24 by positively using the maximum changing speed of the valve timing at that time.

Further, since in the present embodiment, the value obtained by limiting the output changing speed of the first-order lag model with the maximum changing speed of the valve timing is adopted as the output changing speed of the quickest response model 34 and the output of the quickest response model 34 is obtained by integrating the output changing speed of the quickest response model 34, it is possible to control an output of an excessive control duty and continue an output of the control duty in the vicinity of the maximum changing speed of the valve timing in the region where the output changing speed of the first-order lag model is quicker than the maximum changing speed of the valve timing of the variable valve timing apparatus 24, thus improving responsiveness. And when the output of the first-order lag model comes close to the target advance amount and enters into the region where the output changing speed of the first-order lag model is slower than the maximum changing speed of the valve timing, the output of the first-order lag model can be set as the output of the quickest response model 34 as it is, and it is possible to further improve convergence of the actual advance amount to the target advance amount by appropriately lowering the changing speed (advance speed or retard speed) of the valve timing of the variable valve timing apparatus 24 in the region close to the target advance amount.

In addition, since in the present embodiment, the time delay of the variable valve timing apparatus 24 is calculated based upon the condition of the engine 11 or the variable valve timing apparatus 24 and the control duty of the variable valve timing apparatus 24 is calculated based upon the output obtained by applying the time delay to the output of the quickest response model 34, the time delay changing with the condition of the engine 11 or the variable valve timing apparatus 24 is accurately calculated, thereby calculating the control duty of the variable valve timing apparatus 24 in consideration of the time delay.

Further, since in the present embodiment, the time delay is corrected by using the correction rate K of the time delay obtained by dividing the changing speed of the target advance amount by the maximum changing speed (the maximum advance speed or the maximum retard speed) of the valve timing, it is possible to increase an output of the control duty of the feedback due to reducing the time delay of the reference model when the changing speed of the target advance amount is small, thus improving responsiveness.

In addition, since in the present embodiment, the maximum changing speed of the valve timing calculated based upon the condition of the engine 11 or the variable valve timing apparatus 24 is used in the case of obtaining the correction rate K of the time delay, it is possible to set the correction rate K of the time delay by using the maximum changing speed of the valve timing in accordance with the condition of the engine 11 or the variable valve timing apparatus 24.

Note that in the embodiments described above, the present invention is applied to a variable valve timing apparatus which changes valve timing of an intake valve, but not limited thereto, may be a variable valve apparatus which changes a valve lift amount, a valve opening period or the like of an intake valve, and also may be applied to a variable valve apparatus which changes valve opening/closing characteristics (valve timing, a valve lift amount, a valve opening period or the like) of an exhaust valve.

While only the selected preferred embodiment has been chosen to illustrate the present invention, it will be apparent to those skilled in the art from this disclosure that various changes and modifications can be made therein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:

1. A variable valve control apparatus for an internal combustion engine, comprising:
    a variable valve apparatus for changing valve opening/closing characteristics of an intake valve or an exhaust valve for the internal combustion engine;
    a reference model for simulating a desired response characteristic of the variable valve apparatus;
    a valve timing control means for controlling valve timing of the variable valve apparatus by operating a control input of the variable valve apparatus in such a way as to realize a target value of the valve timing by using the reference model; and
    a control input-calculating means for calculating the control input of the variable valve apparatus based upon an output of the reference model obtained when the target value is input to the reference model, wherein
    the reference model is constructed by using a dynamic characteristic of the variable valve apparatus in a region where a changing speed of the valve timing of the variable valve apparatus becomes a maximum changing speed of the valve timing or in the vicinity thereof.

2. The variable valve control apparatus according to claim 1, wherein
    the reference model is constructed in such a way as to calculate the maximum changing speed of the valve timing of the variable valve apparatus and calculate an output of the reference model with the maximum changing speed of valve timing of the variable valve apparatus.

3. The variable valve control apparatus according to claim 1, wherein
    the reference model is constructed in such a way as to calculate an output of the reference model with a value obtained by limiting an output changing speed of a first-order lag model of the target value to the maximum changing speed of valve timing of the variable valve apparatus.

4. The variable valve control apparatus according to claim 1, further comprising:
    a time delay-calculating means for in advance storing in a control map a time delay which is a response delay time to the control input of the variable valve apparatus based upon a condition of at least one of the internal combustion engine and the variable valve apparatus, wherein
    the control input-calculating means calculates the control input of the variable valve apparatus based upon the output of the reference model and the time delay.

5. The variable valve control apparatus according to claim 1, further comprising:
    a time delay-calculating means for in advance calculating a time delay which is a response delay time to the control input of the variable valve apparatus based upon a condition of at least one of the internal combustion engine and the variable valve apparatus, wherein the control input-calculating means calculates the control input of the variable valve apparatus based upon the output of the reference model and the time delay.

6. The variable valve control apparatus according to claim 4, wherein
the time delay-calculating means corrects the time delay in accordance with a change of the target value.

7. The variable valve control apparatus according to claim 6, wherein
the time delay-calculating means sets a correction rate of the time delay in accordance with the maximum changing speed of the valve timing of the variable valve apparatus.

8. The variable valve control apparatus according to claim 6, wherein
the time delay-calculating means sets the correction rate of the time delay by comparing a changing speed of the target value with the maximum changing speed of the valve timing of the variable valve apparatus.

9. The variable valve control apparatus according to claim 7, wherein
the time delay-calculating means uses the maximum changing speed of the valve timing of the variable valve apparatus in advance stored in the control map based upon the condition of at least one of the internal combustion engine and the variable valve apparatus at the time of setting the correction rate of the time delay.

10. The variable valve control apparatus according to claim 7, wherein
the time delay-calculating means uses the maximum changing speed of the valve timing of the variable valve apparatus in advance calculated based upon the condition of at least one of the internal combustion engine and the variable valve apparatus at the time of setting the correction rate of the time delay.

11. The variable valve control apparatus according to claim 1, wherein
the control input-calculating means includes;
a feedback term which calculates a feedback operation amount by comparing the output of the reference model with the valve timing of the variable valve apparatus; and
a feed forward term which calculates a feed forward operation amount based upon the output of the reference model.

* * * * *